United States Patent
Cogan

[11] 4,049,855
[45] Sept. 20, 1977

[54] BOXCELL CORE AND PANEL

[76] Inventor: Scott Douglas Cogan, 7275 Demar Road, Cincinnati, Ohio 45243

[21] Appl. No.: 669,381

[22] Filed: Mar. 22, 1976

[51] Int. Cl.² .............................................. B32B 3/00
[52] U.S. Cl. .................................... 428/116; 93/1 H; 181/284; 428/178; 428/181
[58] Field of Search .............. 428/178, 179, 182, 186, 428/116, 181; 181/33 G, 50, 71; 52/618; 156/197; 93/1 H; 244/123–125

[56] References Cited

U.S. PATENT DOCUMENTS

| 1,100,064 | 6/1914  | Ferres    | 428/186  |
|-----------|---------|-----------|----------|
| 1,802,522 | 4/1931  | Moll      | 428/186  |
| 2,333,343 | 11/1943 | Sendzimir | 181/33 G |
| 3,211,253 | 10/1965 | Gonzalez  | 428/116  |
| 3,231,452 | 1/1966  | Thomas    | 156/210  |
| 3,544,417 | 12/1970 | Corzine   | 428/178  |

Primary Examiner—George F. Lesmes
Assistant Examiner—P. Thibodeau

[57] ABSTRACT

A honeycomb type core configuration for composite structural panels generated by folding sheet material. The box shaped core, when attached to a surface sheet imparts rigidity to the sheet for use as a high strength to weight ratio structural sheet panel. The cell walls of the folded core are integral with the cell bottom which provides a large surface area for ease of attachment to the surface sheet.

4 Claims, 5 Drawing Figures

BOXCELL CORE AND PANEL

This invention relates to a honeycomb type core structure adapted to be utilized in the fabrication of structural sheet panels and to structural hollow panels manufactured by the use of the honeycomb core disclosed herein below.

Honeycomb core structures are conventionally fabricated by the use of a plurality of corrugated strips from various types of materials which are joined to one another by the use of cements, welding or brazing, to form a honeycomb core and subsequently secured to the surface sheet by the utilization of the same cements or joining processes. Obviously, the critical factor involved in the fabrication of the cores and the panels incorporating the cores is the fact that the entire assembly is dependent for its structural integrity upon the efficacy of the cements or joints obtained by the various synthetic adhesives or metalurgical processes used to attach the various elements of the structural panel into an assembly. Therefore, in applications wherein the stresses imposed upon the structural panel are of a high order, break-down of the panel inevitably occurs short of parent material strength capabilities due to joint strength, ductility and errosion of a braze; or as with weld joints, strength deterioration due to nugget stress concentrations. Further, disadvantages have been encountered in elements heretofore used, in manufacturing difficulties, expense of production, and adaptability to various applications without the use of special assembly and fastening techniques.

In order to overcome these obvious defects of conventional structural panels of the honeycomb types, my invention contemplates folding a single sheet of material without slits or cut-outs to obtain a structural core element where the folds become the cell walls and are integral with the cell bottom.

It is understood that the principles of the invention can be applied with cogency to metal and other types of materials, such as resin impregnated fabrics, fibers, paper, and the like where the utilization of the core structure will permit the use of such materials. Furthermore, while the core structure and the surface sheet associated therewith constituting a core reinforced sheet panel can be adhesively bonded into a unified structure, it is understood, for metalic elements other means of attachment of the core to a surface sheet may be resorted to, such as various metalurgical processes like; brazing, welding, or difussion bonding.

It is therefore, an object of my invention to provide a structural core element by folding a single flat sheet of material to make a plurality of cell walls integral with and having right angularity to the cell bottoms.

A further object of the present invention is to provide a composite hollow panel fabricated from core reinforced panel members which are arranged to have improved internal configuration to allow passage of fluids for the purpose of heat transfer or flushing of internal deposits.

Another object of the invention is to provide the structural core element wherein the basic core design may be utilized, but the relative length of the folds may be changed to control the stiffness pattern.

Another object of the invention is to provide the structural core element wherein the basic core design may be utilized, but the frequency of the fold pattern is changed to control the cell depth.

A still further object of the invention is to provide a monolithic structural core element which is adaptable to improved manufacturing methods and has a low manufacturing cost.

A further objective of the invention is to provide a structural core element which is easily handled and lends itself to high speed production.

A still further object of the invention is to provide the structural core element wherein the ductility of the material is not critical due to obviating the necessity for stretching the material in forming.

Other objectives and advantages will become more apparent with the teaching of the principles of the invention in the disclosure of the preferred embodiments thereof in the specification, claims, and drawings, in which:

As shown on the drawings.

Figure 1:
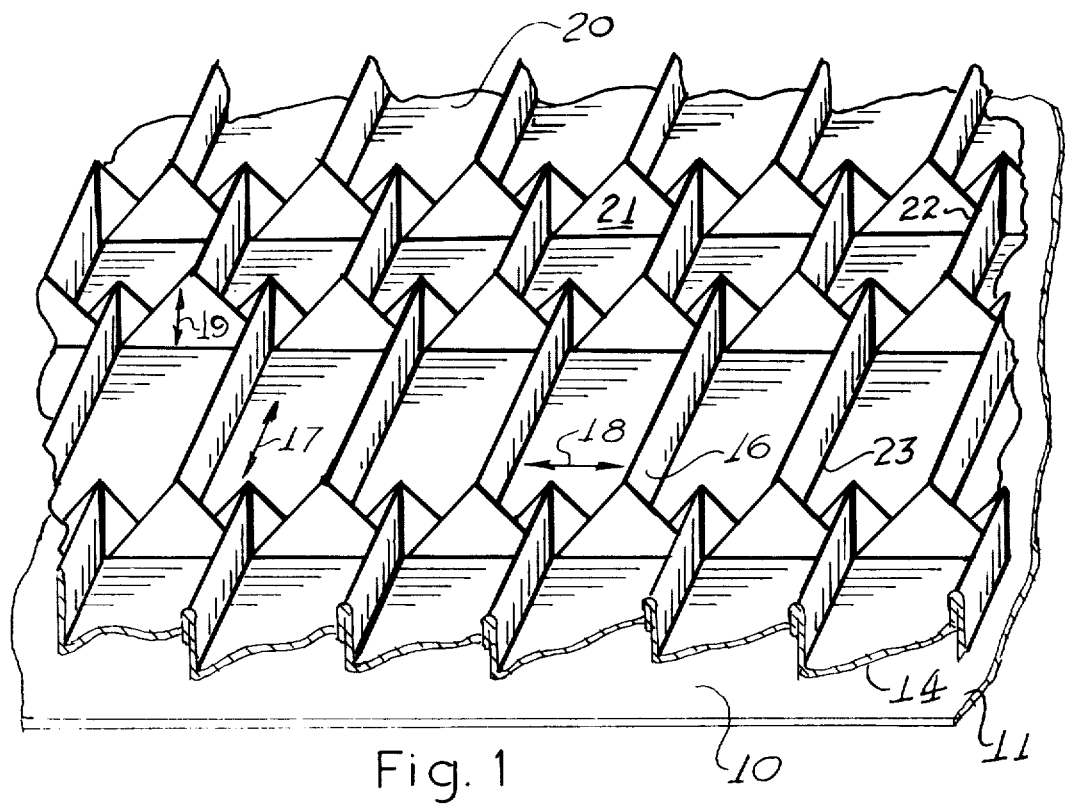
FIG. 1 is a perspective view of a panel reinforced by a core formed in accordance with the principles of the present invention.

As illustrated in FIG. 1, the unitary structural assembly includes a surface sheet or layer 10 and a monolithic core 20. The core is shown in detail particularly in FIG. 2. The core is formed of flat sheet 15 of material, as shown in FIG. 3. The core material 15 may be of a metal or resin impregnated cloth, fiber, or paper and the surface layer 10 of the same or other material. The core material 15 is of sheet material, the forming of the sheet would embody embossing the sheet to form creases followed by a gathering operation to form folds of the correct height. Another method of manufacture of the core would incorporate hydraulic, pneumatic, or vacuum forming over dies to a limited depth followed by gathering the material to the final depth. A still further method of forming the core from sheet would incorporate stamping the sheet with progressive dies or rolling through progressive roll dies to a limited depth followed by gathering to form folds of the correct height.

Figure 2:
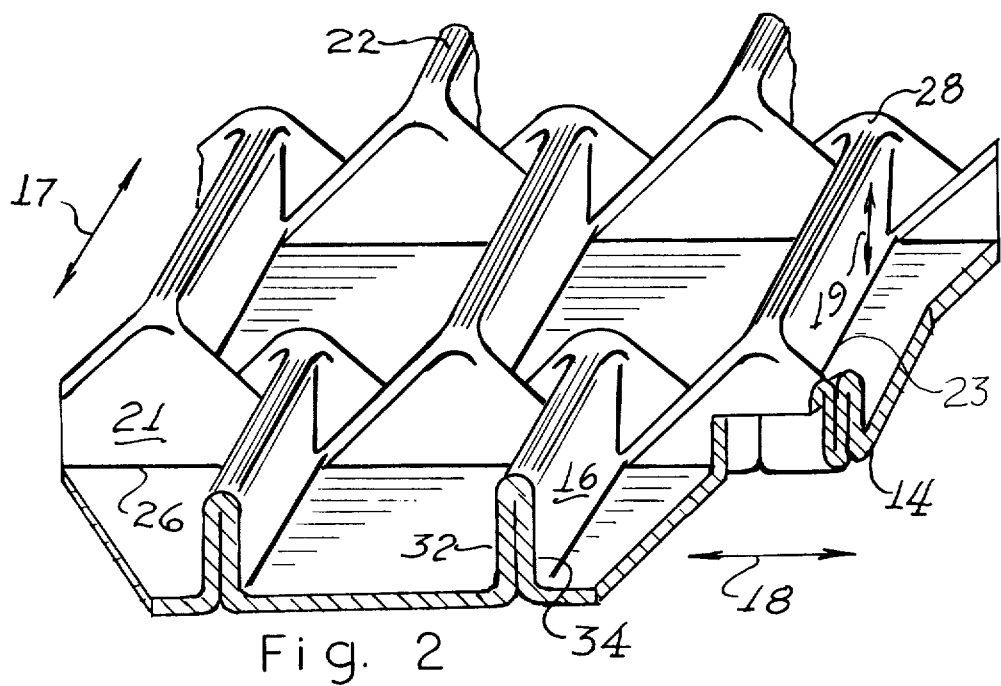
FIG. 2 is a perspective view of the core member taken alone with fragmentary parts being broken away and in section to illustrate the folds for clarity.
Figure 3:
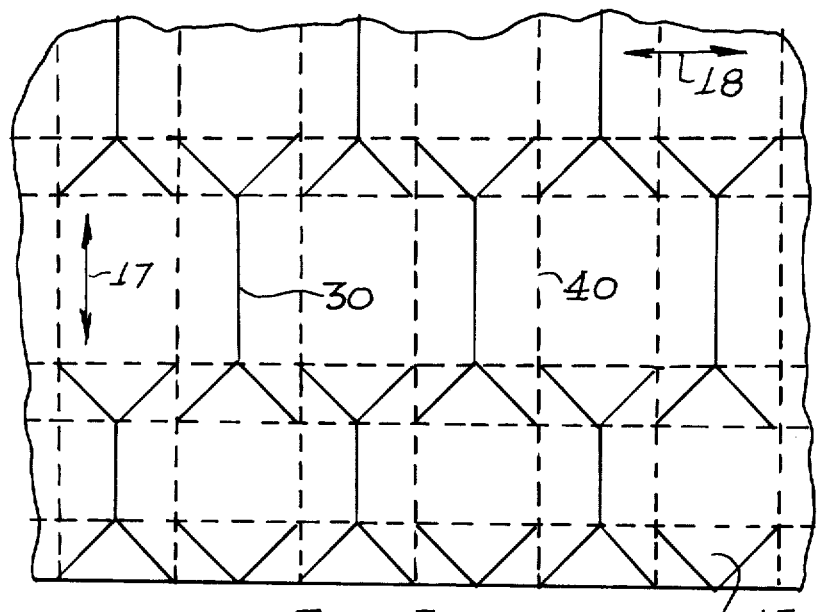
FIG. 3 is a plan view of the layout of the core illustrating the manner of bending the core material.

The core structure as shown in FIGS. 1&2 is formed of a series of accordion like folds or pleats with the pleats 16 extended in a lateral direction as indicated by the arrows 17. The pleats 16 are formed in staggered rows of parallel pleats with rows extended in the longitudinal direction, as indicated by the arrows 18. The pleat depth as indicated by the arrows 19 is one-half the length between the pleats in the longitudinal direction 18. The pleats 16 of any desired lateral length 17 terminate into a triangular gathering fold 21. The individual parallel pleats 16 in each longitudinal row extend in the lateral direction 17 the same length but not necessarily the same lateral length 17 in each longitudinal row. The triangular gathering fold 21 may be considered as being formed in longitudinal rows with the folds being formed on a 45° angle connecting the crest 22 of a lateral pleat 16 with the base 23 of the adjacent lateral pleat 16 in the adjacent longitudinal row of lateral pleats. It will also be seen from viewing FIG. 1 that the triangular folds arrange themselves in a saw tooth pattern in the longitudinal direction 18.

The core structure of FIG. 2 illustrates that each lateral pleat 16 is formed by a downward fold of two parallel walls 32 and 34 which meet along a straight line or crest 22. The base 26 of the triangular gathering fold 21 extends in the longitudinal direction 18 between any two adjacent lateral pleats 16 in the same longitudinal row. The apex 28 of the triangular gathering fold 21 being coincident with the crest 22 of a lateral pleat 16 in the adjacent row of lateral pleats 16 and occurring at one-half the longitudinal length 18 of the base 26.

The core material 15 is layed out flat before manufacture, as illustrated in FIG. 3, and the folds are represented by connecting lines. The solid lines 30 represent downward folds and the dotted lines 40 represent upward folds. By varying the longitudinal spacing 18 of the solid lines 30, the cell wall spacing of the pleats 16 in the longitudinal direction 18 and cell depth 19 in FIGS. 1&2 can be changed to obtain different physical properties of the finished core in conjunction with any desired lateral pleat 16 length, which is established by the lateral length 17 of the solid lines 30 in FIG. 3.

From the above discussion it will be seen that a wide variety of proportions can be obtained by simple folding of a flat sheet along the lines illustrated in FIG. 3. In manufacturing procedures, these folds can be made from a flat sheet 15 by various methods including those above described.

It is to be especially noted that the folding can be obtained by the variety of methods referred to without the need of slits, cut-outs, or the stretching of the material from which the core may be manufactured.

Various types of construction material for the core and sheet may be employed. Stainless steel provides a structure of excellent strength qualities and possesses resistance to corrosive agents, titanium and aluminum being exceptional materials for high strength to weight ratio panels. Other materials such as paper, plastic, and various impregnated fibers, such as glass and graphite, adapt themselves readily to the principles of the invention and these materials permit a wide variety of applications for use.

The formed core element 20 may be subsequently joined to a surface sheet 10 by the introduction of a bonding agent between the flat surface 14 of the core element 20 and the mating side 11 of the surface sheet 10 as shown in FIG. 1.

The core in its final gathered form 20 provides a flat continuous surface of cell bottoms 14 to permit ease of joining the core to a surface sheet 10 by various conventional means. Joining can be achieved by high temperature brazing, diffusion bonding, if a metal is used, or by seam or spot welding. For low temperature applications of metalic and non-metalic materials, adhesives of high bonding quality will provide the requisite strength of joining in the manufacture of the reinforced sheet panels shown in FIG. 1.

Figure 4:
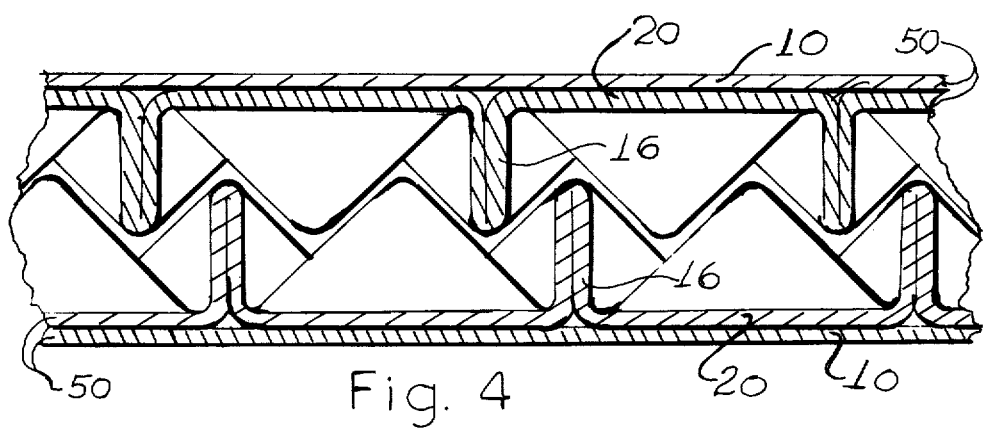
FIG. 4 is a front elevational view of two assembled core reinforced panels.
Figure 5:
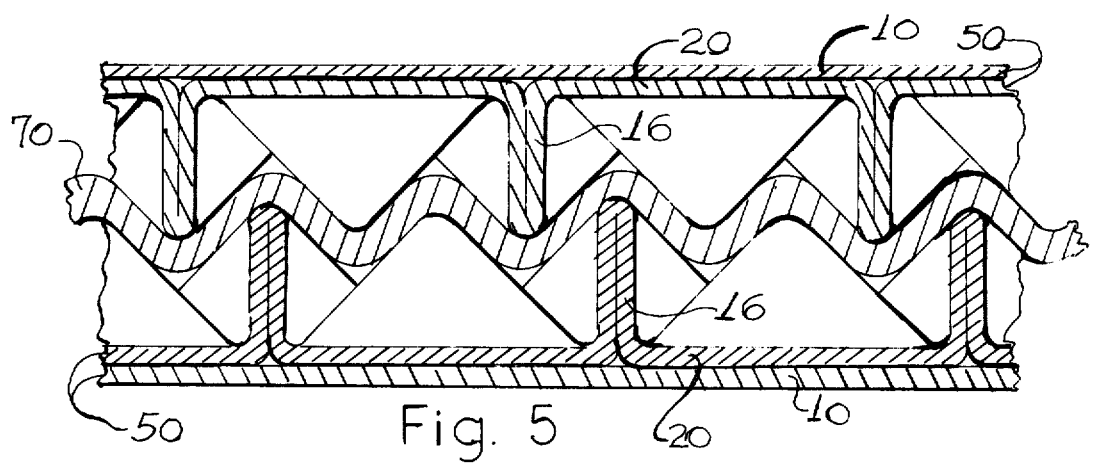
FIG. 5 is a front elevational view of two assembled core reinforced panels with an interleafed corrugated sheet.

Further, two such reinforced sheet panels 50, consisting of a core element 20 and a surface sheet 10, may be assembled to produce a hollow panel having both exposed surfaces being the sheet material 10 as illustrated in FIG. 4. Attachment of the two reinforced sheet panels 50 into a unified hollow panel may be accomplished by the use of adhesives or metalurgically joined, when the reinforced sheet panels 50 are fabricated of a metalic material. The two reinforced sheet panels 50 coact to form a flow passage with internal lateral pleats 16 that act as fins to facilitate heat exchange. A center corrugated sheet 70 of material may be introduced between two reinforced sheet panels 50 to provide additional surface area for joining the two reinforced sheet panels 50 into a unified structure as shown in FIG. 5. Foam fillers or interleafed accustical absorption material may be incased between two reinforced sheet panels 50 prior to or after joining into a hollow panel.

Thus, it will be seen that I have provided an improved unitary composite structural member which meets the objectives and advantages herein before set forth. The structure presents a unitary panel which is well suited to use as a structural building material for walls, floors, and roofing with encased insulation or flow thru passages for heat transfer. Other potential applications utilizing the high strength to weight achievable in metals and fiber impregnated materials for use in the manufacture of structural and aerodynamic surfaces of aircraft, marine, and automotive components. It will also be recognized that the structure is capable of low manufacturing cost. The structure can employ a single sheet in the manufacture of the core and can utilize any number of the production manufacturing processes referred to above. The composite panel is easy to handle, as well as the materials for construction of the panel. Numerous materials may be employed and the ductility of the material is not critical as in other constructions, since the material need not be stretched in forming of the core.

I have, in the drawings and specifications, presented a detailed disclosure of the preferred embodiment of my invention, and it is to be understood that I do not intend to limit the invention to the specific form disclosed, but intend to cover all modifications, changes and alterative constructions and methods falling within the scope of the principles taught by my invention.

I claim as my invention:

1. A structural monolithic cellular core element consisting of a multiplicity of rectangular cell openings within the body of the material, two sides of all said rectangular cell openings being a plurality of parallel pleats projecting substantially normal to the plane of one side of said material, said pleats being in rows whereas the rows extend in a direction normal to the plane of said pleats and the pleats are uniformly spaced, the depth of said pleats measured in a direction normal to the plane of said material being approximately one-half the distance between adjacent pleats in a single said row of pleats, adjacent said rows of pleats have an offset of said pleats a distance approximately equal to the said pleat depth, the length of said pleats measured in the direction of the pleat fold being essentially the same for all pleats in a single said row of pleats and the pleats terminate in length at each end into triangular gathering folds thereof directed in planes substantially normal to the planes of said pleats and closing the remaining two sides of said rectangular cell openings, said triangular gathering folds being isosceles in transverse cross section and having an altitude essentially equal to the said pleat depth with the apex angle of said triangular gathering folds bisected by said pleats and said triangular gathering folds have a base length equal to the distance between two adjacent pleats in said row of pleats, the said triangular gathering fold base length being in the plane of said material, the side of said material opposite the projecting said pleats and said triangular gathering folds being a plane and closing one end of said rectangular cell openings.

2. A structural reinforced panel assembly comprising: at least one monolithic cellular core element consisting of a multiplicity of rectangular cell openings within the body of the material, two sides of all said rectangular cell openings being a plurality of parallel pleats projecting substantially normal to the plane of one side of said material, said pleats being in rows whereas the rows extend in a direction normal to the plane of said pleats and the pleats are uniformly spaced, the depth of said pleats measured in a direction normal to the plane of said material being approximately one-half the distance between adjacent pleats in a single said row of pleats, adjacent said rows of pleats have an off-set of said pleats a distance approximately equal to the said pleat depth, the length of said pleats measured in the direction of the pleat fold being essentially the same for all pleats in a single said row of pleats and the pleats terminate in length at each end into triangular gathering folds thereof directed in planes substantially normal to the planes of said pleats and closing the remaining two sides of said rectangular cell openings, said triangular gathering folds being isosceles in transverse cross section and having an altitude essentially equal to the said pleat depth with the apex angle of said triangular gathering folds bisected by said pleats and said triangular gathering folds have a base length equal to the distance between two adjacent pleats in said row of pleats, the said triangular gathering fold base length being in the plane of said material, the side of said material opposite the projecting said pleats and said triangular gathering folds being a plane and closing one end of said rectangular cell opening; a sheet material contacting and bonded to the said plane side of said monolithic cellular core element.

3. A sandwich type structural hollow panel consisting of at least two structural reinforced panel assemblies as defined in claim 2, where the outermost surfaces of the said hollow panel are exposed surfaces of the sheet material of said structural reinforced panel assemlies, the projecting pleats and triangular gathering folds of two opposing structural reinforced panel assemblies having identical patterns where the triangular gathering folds are mutually interlocked and bonded, the interposed monolithic cellular core element spacing apart the said sheet material of said structural reinforced panel assemblies.

4. A sandwich type structural hollow panel consisting of at least two structural reinforced panel assemblies as defined in claim 2, where the outermost surfaces of the said hollow panel are exposed surfaces of the sheet material of said structural reinforced panel assemblies, the projecting pleats and triangular gathering folds of two opposing structural reinforced panel assemblies having different patterns where the pleat spacing of one reinforced panel assembly is an even multiple of the opposing structural reinforced panel assembly, the contacting triangular gathering folds being mutually interlocked and bonded, the interposed monolithic cellular core element spacing apart the said sheet material of said structural reinforced panel assemblies.

* * * * *